(12) United States Patent
Danilchenko et al.

(10) Patent No.: US 12,014,221 B2
(45) Date of Patent: Jun. 18, 2024

(54) SEMANTIC META FEDERATION BROKER FOR CLOUD ENVIRONMENTS

(71) Applicant: Schneider Electric USA, Inc., Andover, MA (US)

(72) Inventors: Victor Danilchenko, South Hadley, MA (US); Thomas Whitehill, Westford, MA (US); Charbel El Kaed, New York, NY (US)

(73) Assignee: Schneider Electric USA, Inc., Boston, MA (US)

( * ) Notice: Subject to any disclaimer, the term of this patent is extended or adjusted under 35 U.S.C. 154(b) by 749 days.

(21) Appl. No.: 17/045,423

(22) PCT Filed: Apr. 8, 2019

(86) PCT No.: PCT/US2019/026323
§ 371 (c)(1),
(2) Date: Oct. 5, 2020

(87) PCT Pub. No.: WO2019/195833
PCT Pub. Date: Oct. 10, 2019

(65) Prior Publication Data
US 2021/0149739 A1    May 20, 2021

Related U.S. Application Data

(60) Provisional application No. 62/653,917, filed on Apr. 6, 2018.

(51) Int. Cl.
*G06F 9/50* (2006.01)
*G06F 9/46* (2006.01)
(Continued)

(52) U.S. Cl.
CPC .......... *G06F 9/5072* (2013.01); *G06F 9/466* (2013.01); *G06F 9/505* (2013.01); *G06F 16/367* (2019.01); *G06F 16/38* (2019.01)

(58) Field of Classification Search
CPC ....... G06F 9/5072; G06F 16/367; G06F 16/38
See application file for complete search history.

(56) References Cited

U.S. PATENT DOCUMENTS 8,813,205 B2    8/2014  Deshmukh et al.
8,972,405 B1 *  3/2015  Chaulk ................ G06F 16/182
                                                707/808
(Continued)

FOREIGN PATENT DOCUMENTS

CN      104246743 B    12/2014
CN      104094576 B    11/2016
(Continued)

OTHER PUBLICATIONS

International Search Report and Written Opinion for PCT application No. PCT/US2019/026323 dated Jun. 11, 2019, 14 pages.
(Continued)

*Primary Examiner* — Dong U Kim
(74) *Attorney, Agent, or Firm* — Locke Lord LLP

(57) ABSTRACT

Methods and systems for a meta federation broker extend requests for computing services across multiple different cloud computing environments using ontology models. The meta federation broker may receive, from a federation participant, a federation participant query that includes semantic query data. At least one federation service from a plurality of federation services can be determined, based on processing the federation participant query and ontological data defining a ontology model, each ontology model describing federation services based on relationships between components of a federated cloud computing environment. The meta federation broker can validate a federation cloud broker that provides the at least one federation service to the federation participant and facilitate brokering
(Continued)

of the at least one federation service to the federation participant by the federation cloud broker.

30 Claims, 9 Drawing Sheets

(51) Int. Cl.
  *G06F 16/36* (2019.01)
  *G06F 16/38* (2019.01)

(56) References Cited

U.S. PATENT DOCUMENTS

| | | | |
|---|---|---|---|
| 9,152,441 | B2 | 10/2015 | Anderson |
| 2011/0231525 | A1* | 9/2011 | Balani ............... G06F 9/5072 |
| | | | 709/226 |
| 2013/0227568 | A1 | 8/2013 | Anderson |
| 2015/0067171 | A1 | 3/2015 | Yum et al. |
| 2016/0065417 | A1* | 3/2016 | Sapuram ............ H04L 41/50 |
| | | | 709/223 |
| 2016/0149769 | A1* | 5/2016 | Joshi ............... H04M 15/8016 |
| | | | 715/739 |

FOREIGN PATENT DOCUMENTS

| | | |
|---|---|---|
| EP | 2405386 A2 | 8/2011 |
| WO | 2008111031 A2 | 9/2008 |

OTHER PUBLICATIONS

Elarbi Badidi; "Towards Cooperative Cloud Service Brokerage for SLA-driven Selection of Cloud Services"; Springer International Publishing, Switzerland 2015; 2 pages.

Prashant Khanna, et al.; "Distributed Cloud Brokerage: Solution to Real World Service Provisioning Problems"; ARPN Journal of Engineering and Applied Sciences, vol. 10, No. 5, Mar. 2015; 6 pages.

B. Prabhakaran and S. Sathish Kumar; "Study on Ontology use in Cloud Computing"; International Journal of Societal Applications of Computer Science, vol. 2 Issue 12, Dec. 2013; 5 pages.

Miranda Zhang, et al.; "An Ontology-based System for Cloud Infrastructure Services' Discovery"; 8th International Conference on Collaborative Computing: Networking, Applications and Worksharing (CollaborateCom); Oct. 14-17, 2012; 7 pages.

Communication pursuant to Article 94 (3)EPC dated Aug. 25, 2023.

* cited by examiner

SEMANTIC META FEDERATION BROKER FOR CLOUD ENVIRONMENTS

CROSS-REFERENCE TO RELATED APPLICATIONS

This application for patent claims the benefit of priority to and hereby incorporates by reference U.S. Provisional Application No. 62/653,917, entitled "Semantic Meta Federation Broker Methods for Cloud Environments," filed Apr. 6, 2018.

FIELD OF THE INVENTION

Embodiments of the present disclosure relate generally to cloud computing and more specifically to systems and methods for querying and associating cloud-based service providers with federation cloud brokers in a federated cloud computing environment.

BACKGROUND

"Cloud computing" or "the cloud" generally refers to a network of computers and servers, both physical and virtual, that provide services over public and private network connections. The services provided via the cloud may include, for example, data storage, data processing, data analytics, event monitoring and detection, alarm notification, user authentication/authorization, data integration, and the like. Some of these cloud-based services are often referred to by what they provide "as a service," such as Software as a Service (SaaS), Data Storage as a Service (DaaS), Infrastructure as a Service (IaaS), Platform as a Service (PaaS), among others. Cloud service providers usually charge for these services on a subscription basis, per-use basis, per-hour basis, per-volume basis, and the like.

With the proliferation of cloud services from an increasing number of cloud service providers, many consumers (e.g., individuals, companies, enterprises, etc.) are finding it difficult to find cloud services that meet their functionality, pricing, and Quality-of-Service (QoS) requirements. Moreover, cloud services may be homogenous or heterogeneous in nature depending on the respective cloud environment and/or cloud service provider. Obtaining the latter within the same cloud environment may be subject to various limitations, as dissimilar services may not operate well with one another. This difficulty is compounded when consumers need to obtain cloud services from multiple distinct cloud service providers or environments in order to create a complete solution.

One option for addressing the above difficulty is by forming a federated cloud environment, or cloud federation. Cloud federation refers to an arrangement where federation participants operate together and/or share infrastructures to provide cloud services to other federation participants in a way that appears seamless to the participants. These federation participants include cloud service providers, customers, auditors, carriers, brokers, and the like. Brokers, in particular, are services that manage provisioning of the federated cloud services and negotiate monetization of the cloud services between the cloud service providers and also between the providers and other federation participants. Such federation cloud brokers act as agents to match cloud services with participant requirements to help consumers select suitable federated cloud services.

Current federated cloud environments, however, do not provide any capability for cloud service consumers to search for federation cloud brokers and/or the cloud services brokered by such federation cloud brokers.

SUMMARY OF THE DISCLOSED EMBODIMENTS

Embodiment disclosed herein provide systems and methods for allowing of cloud service consumers to search for federation cloud brokers and/or the cloud services brokered by the federation cloud brokers. The systems and methods provide a Meta Federation Broker (MFB) for a federated cloud computing environment that serves as a sort of cloud-based registry for federation cloud brokers and federated cloud services. Federation cloud brokers may then register the federated cloud services they broker on the MFB along with pricing and other information about the federated services. Other federation participants that are not brokers as well as non-federation participants may also register cloud services in some embodiments. In some embodiments, the MFB enforces the use of ontology models and semantic languages to define an ontology that represents both components and semantics of a federation, including various metadata, as well as providing detailed descriptions of federation services. The use of ontology models and semantic languages advantageously allows cloud consumers and other participants of the cloud federation to search the MFB using semantic queries, thus resulting in more contextually meaningful search results.

Embodiments of the MFB provide a number of benefits for cloud participants. For example, the MFB helps define a cloud environment in terms of a set of ontology models that describe cloud environment characteristics, such as capabilities, geography, utilities, and/or protocols, using a common ontology language that is searchable using contextual or semantic queries. In addition, the MFB provides a centralized registry where federation cloud brokers can register federated cloud services for other cloud federation participants, including cloud service providers, consumers, brokers, auditors, and/or carriers, and the like, to search. Searching of the MFB for ontology models and/or federation cloud brokers, including filtering based on social networking reviews and/or rankings, may be implemented using known searching techniques. As well, techniques for implementing a trust mechanism to validate cloud federation participants and techniques for monetizing cloud services and managing financial transactions between the cloud federation participants may also be used.

The above arrangement allows various federation cloud brokers to declare themselves to the MFB as brokers of specific federation ontologies (e.g., identity federation, storage federation, compute federation, etc.). Federation cloud brokers along with non-brokers federation participants and even non-federation-participants may also define new federation ontologies (e.g., federated message bus, federated email service, federated IoT platform, etc.) and register them with the MFB. Then, various participants interested in federation services can communicate with the MFB, perform a discovery by querying the MFB for any federation providers implementing specific federation ontologies, and interact with those providers in a manner defined by the ontology in order to consume the federation brokerage services and federated cloud services being brokered. This creates a highly extensible marketplace for cloud federation standards and services that integrates trust capabilities based at least on technological solutions (e.g., SSL and the delegation of trust mechanisms) and a discovery process that includes parametric filtering, based on criteria such as Quality of Service (QoS), cost models, pricing, user reviews, and/or social-media-style ratings, for example.

Thus, in general, in one aspect, one or more embodiments of the present disclosure are directed to a system a method of implementing a federated computing environment. The method includes, among other things, receiving, at a meta federation broker, from a federation participant, a federation participant query that includes semantic query data, and identifying at least one ontology model from a plurality of ontology models based on processing the semantic query data included in the federation participant query, each ontology model containing ontological data that describes federation services based on relationships between components of the federated computing environment. The method further includes validating, by the meta federation broker, a federation broker that brokers at least one federation service described by the ontological data in the at least one ontology model, and facilitating, by the meta federation broker, brokerage service related to the at least one federation service from the federation broker to the federation participant.

In general, in another aspect, one or more embodiments of the present disclosure are directed to a method a method of implementing a federated computing environment. The method includes, among other things, requesting, from a meta federation broker, a federation ontology model defining an ontology that describes federation services using relationships between components of the federated cloud computing environment. The method further includes identifying a federation broker that brokers a federation service described in the federation ontology model, and validating the federation broker with the meta federation broker. Upon successfully validating the federation broker with the meta federation broker, the method transmits a request for the federation service to the federation broker, and receives, from the federation broker, brokerage service related to the federation service.

In general, in yet another aspect, one or more embodiments of the present disclosure are directed to a non-transitory computer-readable medium for implementing a federated computing environment. The non-transitory medium includes, among other things, one or more computer processors and a memory containing computer program code that. The computer program code, when executed by operation of the one or more computer processors, performs an operation comprising registering a new ontology model with a meta federation broker in an ontology model library of the meta federation broker, and registering, with the meta federation broker, as a federation broker for the new ontology model, where the new ontology model defines an ontology that characterizes federation services according to relationships between components of the federated computing environment. The computer program code, when executed by operation of the one or more computer processors, performs an operation further comprising, upon receiving a request for a federation service from a federation participant, validating the federation participant with the meta federation broker, and upon successful validation of the federation participant, brokering the requested federation service for the federation participant.

In general, in still another aspect, one or more embodiments of the present disclosure are directed to a meta federation broker for federated computing environment. The meta federation broker includes, among other things, an ontology model library storing a plurality of ontology models, each ontology model containing ontological data that describes federation services based on relationships between components of the federated computing environment. The meta federation broker also includes a federation broker registry storing registration information for a plurality of federation brokers, each federation broker providing brokerage services related to at least one federation service described by the plurality of ontology models, and a discovery processor operable to receive from a federation participant a federation participant query that includes semantic query data, the discovery processor further operable to identify at least one ontology model from the plurality of ontology models based on processing the semantic query data included in the federation participant query. The meta federation broker further includes a registry processor operable to receive, from a federation broker, a registration request to register the federation broker as providing brokerage services related to a federation service described by one of the plurality of ontology models, the registry processor further operable to store registration information for the federation broker on the federation broker registry.

BRIEF DESCRIPTION OF THE DRAWINGS

The foregoing and other advantages of the disclosed embodiments will become apparent upon reading the following detailed description and upon reference to the drawings, wherein.

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve a commercial embodiment. Such implementation specific decisions may include, and likely are not limited to, compliance with system related, business related, government related and other constraints, which may vary by specific implementation, location and from time to time. While a developer's efforts might be considered complex and time consuming, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

This disclosure is not limited in its application to the details of construction and the arrangement of components set forth in the following descriptions or illustrated by the drawings. The disclosure is capable of other embodiments and of being practiced or of being carried out in various ways. Also, the phraseology and terminology used herein is for the purpose of descriptions and should not be regarded as limiting. The use of "including," "comprising," "having," "containing," "involving," and variations herein, are meant to be open-ended, i.e., "including but not limited to."

Figure 1:
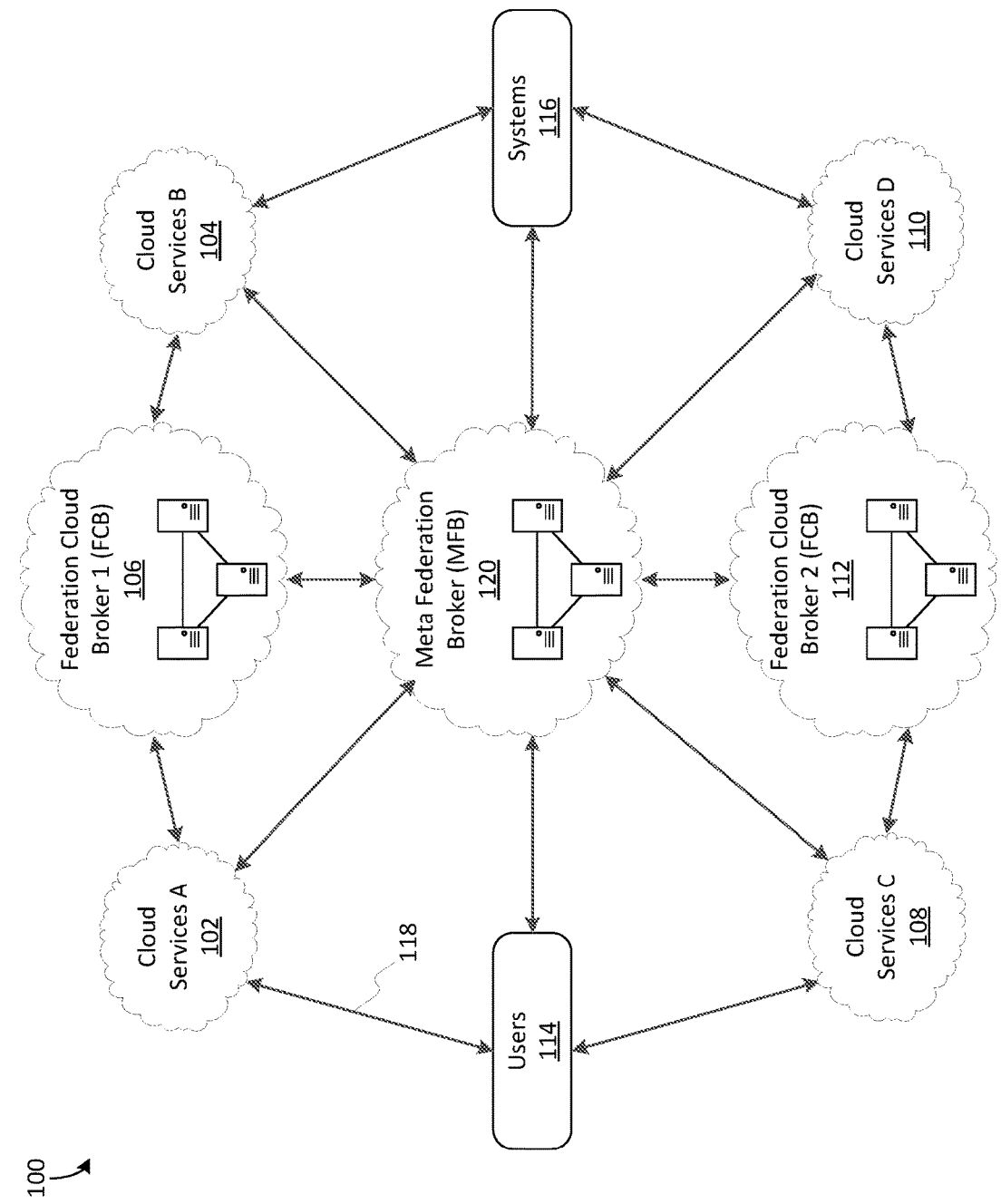
FIG. 1 illustrates an exemplary cloud federation in which a Meta Federation Broker (MFB) may be used in accordance with various embodiments of this disclosure.

Referring now to FIG. 1, an exemplary federated computing environment 100, which may be a federated cloud computing environment, is shown having a number of federation members or participants according to one or more embodiments. In this example, the federation participants include cloud service providers 102, 104 that have federated or otherwise made some or all of their services and/or resources accessible to one another through a federation cloud broker (FCB) 106. The federation of their services and/or resources affords the cloud service providers 102, 104 greater flexibility and interoperability in terms of the cloud services they may offer through the FCB 106. The cloud service providers 102, 104 in this example may be identity service providers and thus the FCB 106 may be an identity FCB 106. Together the cloud service providers 102, 104 and the identity FCB 106 may form an identity federation. Other federation participants may include cloud service providers 108, 110 that have federated or otherwise made some or all or their services and/or resources accessible to one another through another FCB 112. These cloud service providers 108, 110 and the FCB 112 together may form another type of federation, such as a storage federation. Other types of federations that may be formed include a compute federation, a messaging federation, an e-mail federation, and the like.

In general, the cloud service providers 102, 104, 108, 110 may be any person, organization, or entity that has federated a cloud service through an FCB 106, 112. Examples of cloud service providers include Amazon Web Services® by Amazon®, Google Cloud Platform™, Microsoft® Azure®, and the like. Cloud services that may be provided by various cloud service providers include Software as a Service (SaaS), Data Storage as a Service (DaaS), Infrastructure as a Service (IaaS), Platform as a Service (PaaS), and the like.

Similarly, the federation cloud brokers 106, 112 may be any person, organization, or entity that manages the discovery, use, performance, and delivery of cloud services and resources from the cloud service providers 102, 104, 108, 110 to one or more cloud service consumers 114, 116. In general, an FCB 106, 112 provides brokerage services for the federated cloud services offered by the cloud service providers 102, 104, 108, 110. This means each FCB 106, 112 is responsible for handling any interactions needed between their cloud service providers 102, 104, 108, 110 and the other federation participants to consume services. It should be noted that an FCB is technically separate and distinct from a federation broker (FB) (see FIG. 3), with the FB being any person, organization, or entity that manages the use, performance, and delivery of the cloud services, and negotiates the financial and technical relationships between the cloud service providers and consumers. That said, an FB may operate and perform many of the same functions and services as an FCB, and vice versa, with respect to the various embodiments discussed herein.

The cloud service consumers 114, 116 may be any person, organization, or entity that maintains a business relationship with, and uses service from, the cloud service providers 102, 104, 108, 110. These cloud service consumers 114, 116 may include both individual consumers 114 who access and use the cloud services at least partly on a manual basis as well as system consumers 116 that automatically access and use the cloud services. Other federation participants may include, although not expressly shown in FIG. 1, auditors that conduct independent assessments of cloud services, including information system operations and cloud participant security, and carriers that provide network connectivity and transport of cloud services for the various cloud federation participants.

Network connections 118 provide the network connectivity and transport of cloud services for the federated cloud environment 100. Such network connections 118 may be wireless connections or wired connections, including any physical cabling method such as category 5 cable, coaxial, fiber, copper, twisted pair, and any other physical media to propagate electrical signals. Wireless connections may include, but are not limited to personal area networks (PAN), local area networks (LAN), Wi-Fi, Bluetooth, cellular, global, or space-based communication networks.

In accordance with one or more embodiments, a Meta Federation Broker (MFB) 120 may be provided for the federated cloud environment 100. As mentioned earlier, existing federated cloud environments do not provide any capability for cloud service consumers and other federation participants to search for federation cloud brokers and/or the cloud services brokered thereby. The MFB 120 addresses this technical problem by providing a technical solution in the form of a registry that allows the federation participants to log on at an appropriate URI (e.g., website) and search for one or more federation cloud brokers 106, 112 and the cloud services they broker. Likewise, each FCB 106, 112 may log on to the MFB 120 and register their federation type or model and the cloud services they broker along with information such as cost model, pricing, and other information about the services. Federation participants that are not brokers may also log on and register federation types and cloud services. Indeed, even entities that do not participate in any given federation (i.e., non-federation-participants), such as a standards body or research institution may also log on and register federation types and cloud services. The MFB 120 may require the federation cloud brokers 106, 112 to register their federation types and their cloud services using ontology models and semantic languages. The use of ontology models and semantic languages allows the cloud consumers 114, 116 and other federation participants to search the MFB 120 using semantic queries, thereby resulting in search results that are contextually more accurate. In short, the MFB 120 is an entity that stores and manages ontologies which semantically describe specific cloud federation types and capabilities as well as the federation brokers that orchestrate provisioning of federation services under such ontologies.

The term "ontology" is well understood in the art and refers generally to a structured or formal way of representing or describing knowledge or information about a particular subject or concept using semantic language, which captures contextual relationships and associations among various components of the subject or concept. Examples of semantic languages that the MFB 120 may require to be used to define an ontology include Resource Description Framework (RDF), Web Ontology Language (OWL), and OWL-S, among others. The use of semantic language to create ontologies allows the MFB 120 to accept and process semantic queries for the ontologies and thus return more meaningful search results contextually. Such semantic queries, or queries that contain semantic query data, enable retrieval of both explicitly and implicitly derived information based on syntactic, semantic, and structural information contained in the data. As a result, the queries can usually return higher precision search results even in response to relatively fuzzy or wide-open searches by leveraging the use of pattern matching and digital reasoning capabilities.

In some embodiments, the MFB 120 may extend the semantic languages beyond their current capabilities in order to capture additional attributes of a federated computing environment. With OWL-S, for example, the MFB 120 may add attributes to the ontology such as service level agreements (SLA), quality of service (QoS), cost models, pricing information, user reviews and feedback, social-media-style ratings, and the like. This federation extension to OWL-S, which may be referred to as OWL-FED for purposes of this disclosure, includes a top-level extended OWL-S model describing the federation as a whole in terms of extended Service Profile attributes and extended Service Model definitions. A set of such extended OWL-S models may be defined that describe various phases of the federation participation model (e.g., discovery via the MFB, negotiations with the FCB, federated service consumption, provisioning, auditing, etc.) with other federation participants and with the federation cloud brokers.

Figure 2:
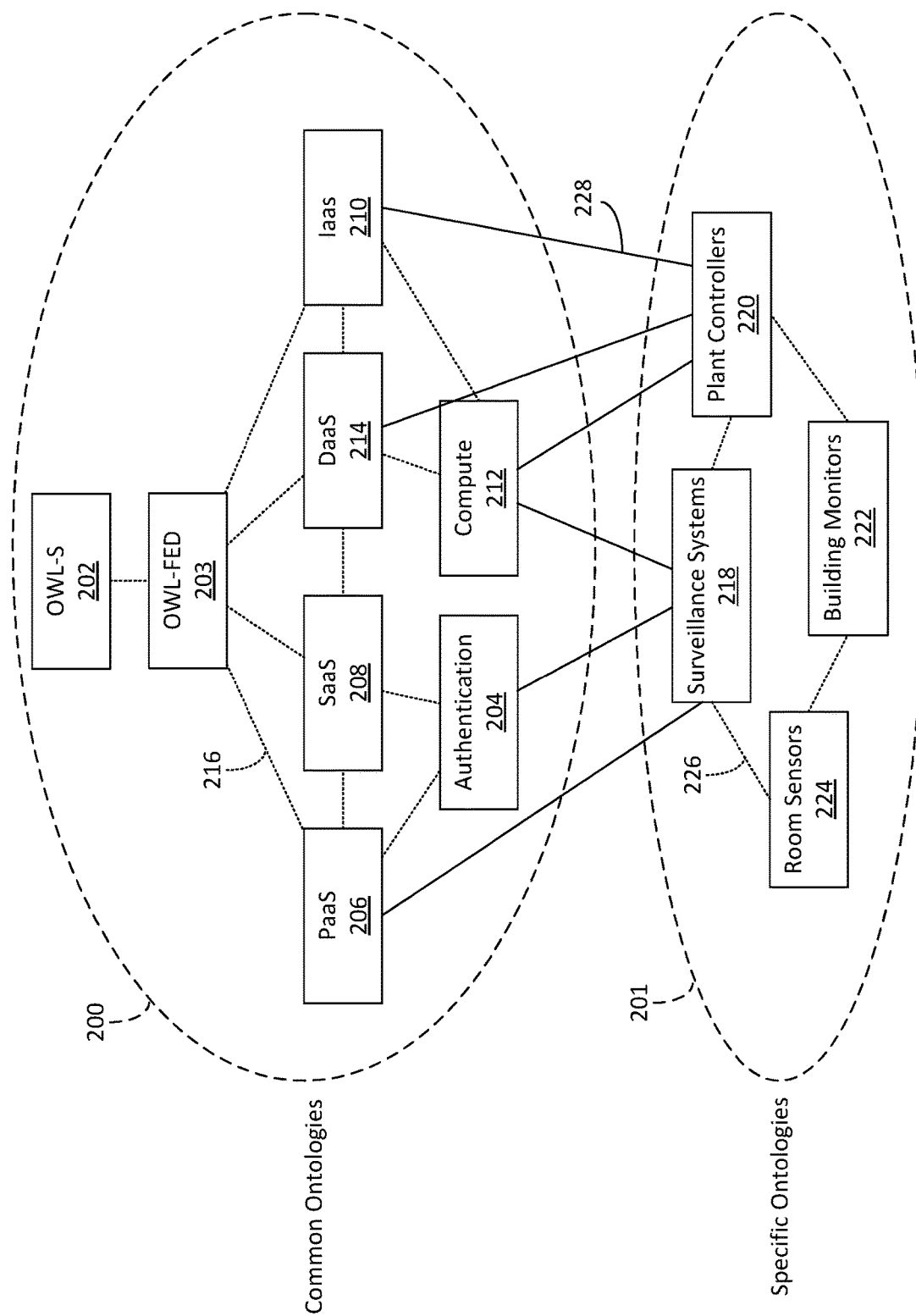
FIG. 2 illustrates exemplary ontologies that may be registered and discovered using an MFB accordance with various embodiments of this disclosure.

FIG. 2 illustrates examples of some of the ontologies that may be managed by the MFB 120, including common ontologies 200 and specific ontologies 201, based on OWL-S (202) and the above extension thereto, OWL-FED (203). Examples of common ontologies 200 include authentication 204, PaaS 206, SaaS 208, IaaS 210, compute 212, DaaS 214, and the like, with potential connections and relationships therebetween indicated by lines 216. Examples of specific ontologies 202 include buildings, surveillance systems 218, plant controllers 220, building monitors 222, room sensors 224, and the like, with potential connections and relationships therebetween indicated by lines 226. Lines 228 indicate potential connections and relationships between one or more of the common ontologies 200 and one or more of the specific ontologies 202.

Figure 3:
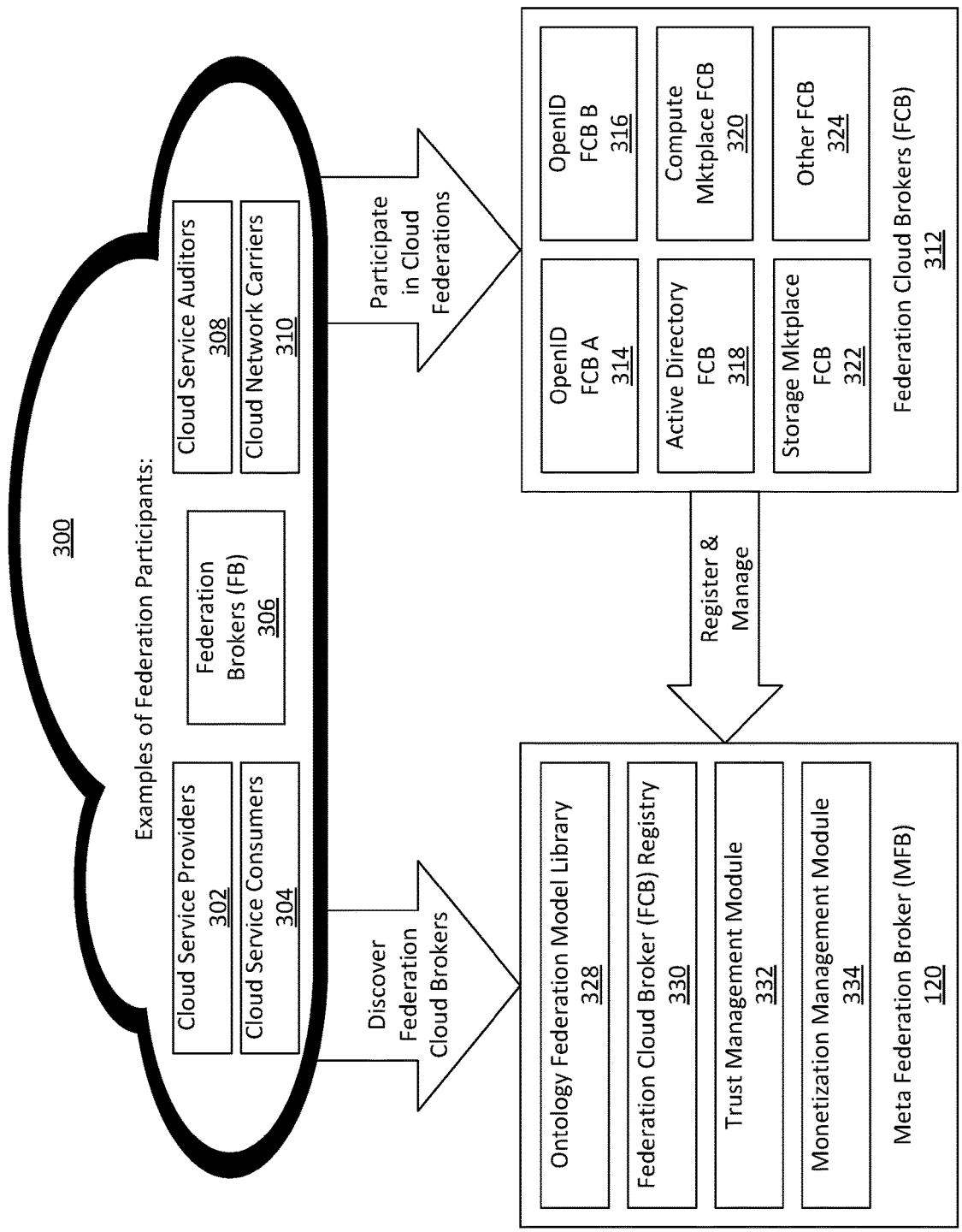
FIG. 3 illustrates an exemplary architecture for an MFB in accordance with various embodiments of this disclosure.

FIG. 3 illustrates an exemplary architecture for an MFB 120 that may be deployed in a federated computing environment 300, which may be a federated cloud computing environment, according to one or more embodiments of this disclosure. As with the federated computing environment 100 (see FIG. 1), the federated cloud environment 300 has several federation participants, including one or more cloud service providers 302, cloud services consumers 304, federation brokers 306, cloud services auditors 308, cloud network carriers 310, and the like. These federation participants 302-310 may be similar in roles and functions to their counterparts in the federated computing environment 100 described above. In particular, the cloud service providers 302 have federated their cloud services via one or more federation cloud brokers, indicated at 312, and each FCB 312 can in turn provide these federated cloud services to the cloud service consumers 304 and other cloud federation participants in a seamless manner.

In the FIG. 3 example, the one or more federation cloud brokers 312 include an OpenID FCB A (314), another openID FCB B (316), an active directory (AD) FCB 318, a compute marketplace FCB 320, a storage marketplace FCB 322, as well as other types of federation cloud brokers 324. Briefly, the openID federation cloud brokers 314, 316 provide openID services, which are basically decentralized authentication services conducted by third-party service providers. Similarly, the active directory FCB 318 brokers active directory services, which are directory services that Microsoft developed for Windows domain networks. The compute marketplace FCB 320 and the storage marketplace FCB 322, as their names suggest, broker compute services and data storage services, respectively.

In accordance with one or more embodiments, each federation cloud broker 312 may log in and register its respective federation type and cloud services at the MFB 120 to allow other federation participants 302-310 to discover the federation cloud brokers 312 and the cloud services they broker. In some embodiments, other federation participants 302-310 may also log in and register federation types and cloud services at the MFB 120. As discussed earlier, the MFB 120 may require the federation types and cloud services to be defined as ontology models using semantic languages in order to enhance searching of the ontology models. To this end, the MFB 120 may include an ontology federation model library 328 that stores the ontology models in a searchable manner (e.g., via one or more databases), and an FCB registry 330 that stores information about the federation cloud brokers 312 in a searchable manner (e.g., via one or more databases).

In general, the ontology federation model library 328 stores ontology models that were created by the federation cloud brokers 312 and uploaded to the MFB 120. Alternatively (or additionally), the ontology models may be created by the federation participants 302-310 and then uploaded and stored at the federation cloud brokers 312 for use in brokering services. In the latter case, the federation cloud brokers 312 may simply upload and store the predefined and prestored ontology models in the ontology federation model library 328. In either case, the ontology models use semantic language to represent and otherwise describe the relationships between various components of the federated cloud computing environment 300. The federation cloud brokers 312 may also make changes and additions to the ontology models and generally manage the ontology models. Additionally, the ontology federation model library 328 may also support user feedback and social-media-style ratings of the ontology models, which may subsequently be used as filters for querying purposes.

The FCB registry 330 provides a registry of federation cloud brokers that allows the federation cloud brokers 312 to publish information about themselves and the cloud services they broker. The federation cloud brokers 312 may likewise make changes and additions to their registrations and generally manage the registrations as needed. And like the ontology federation model library 328, the FCB registry 330 may also support user feedback and social-media-style ratings, which may subsequently be leveraged as filtering criteria for querying purposes.

A trust management module 332 and a monetization management module 334 are also provided in the MFB 120. The trust management module 332 operates to allow the federation cloud brokers 312 and other federation participants to ascertain each other's identities, privileges, and/or trust characteristics. Any suitable authentication technique (e.g., OpenID, AD, etc.) may be used by the trust management module 332, including techniques that involve the re-use of data from the ontology federation model library 328 and the FCB registry 330. The monetization service module 334 facilitates financial transactions between the federation cloud brokers 312 and other federation participants based on their consumption of cloud services, as set out in the ontology federation model library 328 and the FCB registry 330. Any suitable monetization methodologies (e.g., one-time payment, subscription, per-usage, etc.) may be used by the monetization service module 334 to monetize the cloud services, including those that allow the MFB 120 to collect transaction fees and/or other fees.

Figure 4:
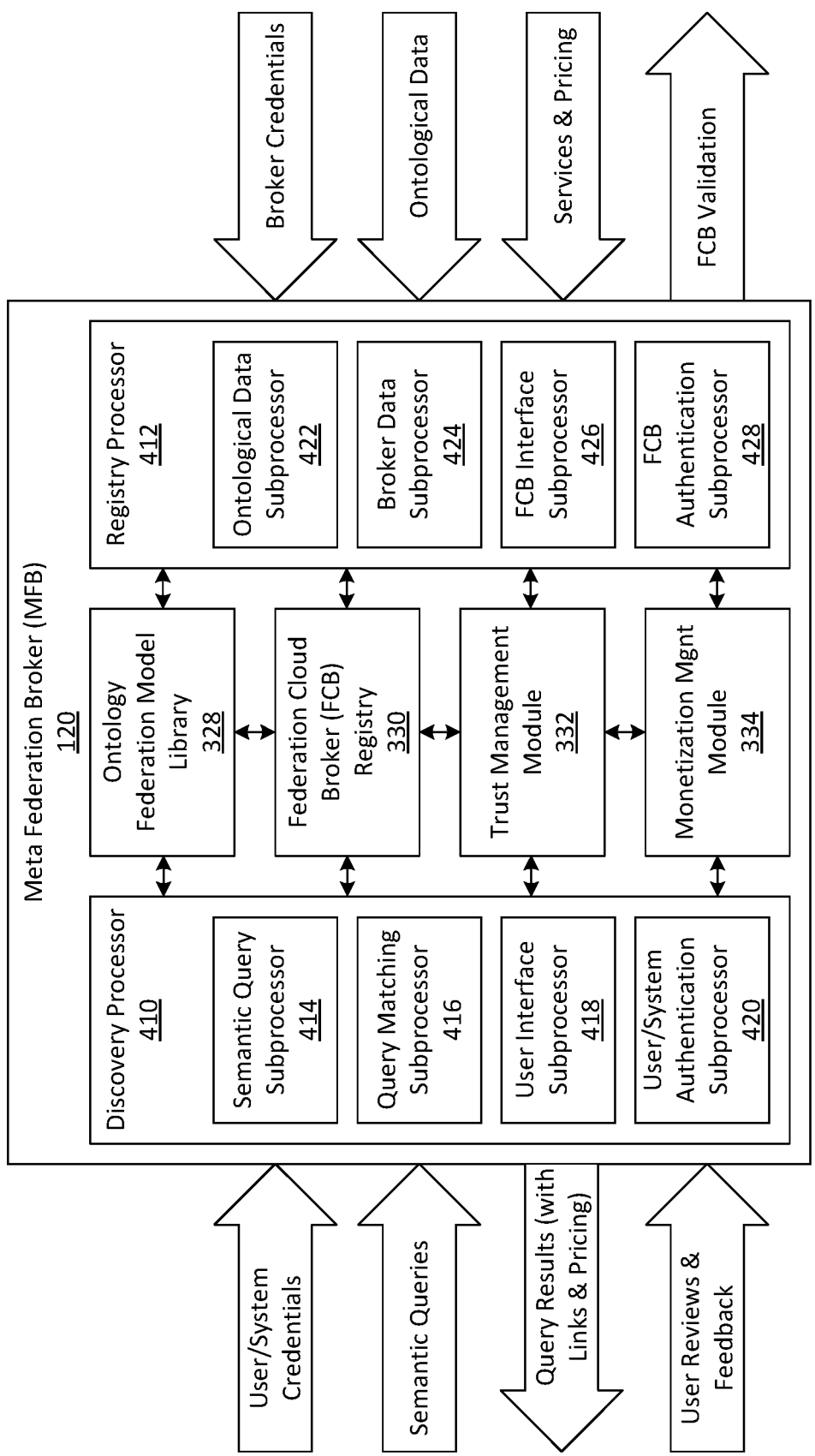
FIG. 4 illustrates an exemplary implementation of an MFB in accordance with various embodiments of this disclosure.

FIG. 4 illustrates an exemplary implementation of an MFB 120 in accordance with one or more embodiments. In keeping with the architecture from FIG. 3, the MFB 120 includes an ontology federation model library 328, an FCB registry 330, a trust management module 332, and a monetization management module 334. As discussed, the ontology federation model library 328 stores ontology models that use semantic language to represent or otherwise describe relationships between components of a federated computing environment, while the FCB registry 330 stores registration information for the federation cloud brokers and the cloud services they broker. The storage may be a centralized database in some embodiments, or it may be distributed among several databases in some embodiments.

In some embodiments, the MFB 120 may also include one or more computer processors programmed to implement FCB discovery functionality 410 and FCB registration functionality 412. In general, the Discovery processor 410 operates to allow federation participants to discover the ontology models and the federation cloud brokers, and the Registry processor 412 operates to allow the federation cloud brokers to upload and store their ontology models and respective registration information. These processors 410, 412 may physical processors or they may be virtual processors implemented using software or combination of hardware and software.

In the example of FIG. 4, the Discovery processor 410 has a number of subprocessors, including a semantic query subprocessor 414 and a query matching subprocessor 416. The semantic query subprocessor 120 operates to receive semantic queries from users, including queries that are manually entered by a user as well as queries that are automatically generated by the system. The query matching subprocessor 416 operates to process the semantic queries against the ontology federation model library 328 and/or the FCB registry 330 and determine whether any ontology models and/or federation cloud brokers have cloud services that match the semantic queries. Thereafter, the query matching subprocessor 416 provides the query results, including hyperlinks and/or other identifying information, for any matching federation cloud brokers and their cloud services, which may include pricing information and user ratings in some embodiments, to the users and/or systems that submitted the queries. A user interface subprocessor 418 operates to allow users to engage in various interactions with the MFB 120 (e.g., via a graphical user interface), and a user/system authentication subprocessor 418 operates to authenticate user/system credentials in a known manner prior to permitting interaction with the MFB 120.

The Registry processor 412 likewise has a number of subprocessors, including an ontological data subprocessor 422 and a broker data subprocessor 424. The ontological data subprocessor 422 operates to impose one or more ontological rules on the ontology models uploaded or otherwise stored in the ontology federation model library 328 by the federation cloud brokers to ensure the models comply with ontological requirements. In this way, the ontological data subprocessor 422 can verify that the ontology models have the specific data structures and use the specific semantic language required by the MFB 120, as discussed further below. The broker data subprocessor 424 operates in a similar manner to provide verification with respect to the types of registration information entered in the FCB registry 330 by the federation cloud brokers. An FCB interface subprocessor 426 operates to provide any application interfaces (e.g., API, etc.) required by the federation cloud brokers to interact the MFB 120, and an FCB authentication subprocessor 428 operates to authenticate FCB credentials in a known manner prior to permitting entry of any ontology models or FCB registrations.

An example of an FCB registration that may be registered with an MFB and stored in an FCB registry is shown below in Example 1. In this example, the exemplary FCB registration may include the federation type of the FCB, the cloud service providers that have federated their cloud services through the FCB, and a listing of the cloud services brokered by the FCB. Those skilled in the art will appreciate that the FCB registration may be more complex than the example shown, including more detailed information about the FCB, the federated cloud service providers, and their cloud services, such as cost model and pricing information. The FCB registration may then be discovered when federation participants search the FCB registry and ontology federation model library for federation cloud brokers and/or cloud services using semantic queries that match the FCB registration.

| FCB A | | |
|---|---|---|
| Federation Type | Service Providers | Brokered Services |
| OpenID | Provider X | Authentication 1 |
|  | Provider Y | Authentication 2 |
|  | Provider Z | Authentication 3 |
|  | ... | ... |

Example 1: Federation Cloud Broker Registration

Cloud services may be described using a semantic language like RDF, OWL, or OWL-S in the ontology model, as mentioned earlier, extended to cover the necessary federation characteristics. This extension of OWL-S is referred to herein as OWL-FED. The use of ontology models provides a formal or structured way to capture the contextual relationships and associations among various functions and characteristics of the cloud services. An ontology model that uses the OWL-FED language, for example, would describe a cloud service using the following OWL-S components: Service Profile, Service Model, and Service Grounding. In general, the Service Profile describes what the service does, while the Service Model tells how the service is used, including the inputs, outputs, pre-conditions, and results of service execution. The Service Model can also describe a process and interactions between the various federation participants. The process can be based on, for example, atomic transactions or composed transactions (e.g., assembling various atomic transactions). The Service Grounding describes how to use the service through technological means, such as the REST API, or specific protocols or web sockets.

The ontology model may also include a description of the interactions of the federation participants with the cloud federation. In general, the interactions of the federation participants with the cloud federation may be conceptualized as a series of service interactions. This is because the federation participants are interacting with specific network services and performing specific requests and actions when using cloud federation services. These requests and actions include federation discovery (i.e., the federation participant is interacting with the MFB to discover cloud services), federation negotiation (i.e., the federation participant is interacting with the federation cloud brokers to establish pricing and other monetary terms), and federation participation (i.e., the federation participant is interacting other federation participants as providers, customers, auditors, etc.).

In one embodiment, the federation interactions are defined as a series of OWL-S service definitions in the ontology model, collectively representing the extension to OWL-S referred to above as OWL-FED. In such an embodiment, each service definition could correspond to a set of service interactions, the service definitions being united under a single federation-level OWL-FED description that provides an overarching view of the federation. Such a federation-level OWL-FED description may include certain federation-specific information that is currently outside OWL-S, and specified in OWL-FED. The federation-specific information may include a federation-specific Service Model that defines the composition of individual federation services, specified using OWL-S. The information may also include a federation-specific Service Profile that defines federation characteristics, again specified using OWL-S. These characteristics may include, for example, Quality of Service (QoS), cost models, pricing information, user reviews and feedback, social-media-style ratings, and the like. Cloud federation participants may then "look up" the federation cloud brokers for specific federated cloud services that meet their needs and requirements.

An example of an ontology model that may be stored in the ontology federation model library of an MFB is shown below in Example 2. As described above, the ontology model (Ontology Model A) may include ontological data such as a federation-specific Service, a federation-specific Service Model, a federation-specific Service Profile, and a federation-specific Service Grounding, all described using OWL-S. Those skilled in the art will again appreciate that the ontology model may be more complex than the example shown, including more detailed ontological data about the FCB, the federated cloud service providers, and their cloud services, such as cost model and pricing information. The ontology models may then be discovered when federation participants search the ontology federation model library.

| Ontology Model A | | | |
|---|---|---|---|
| Federated Service | Federation Type | OWL-S Comp | Definition |
| Service A | Type X | Service Model | How service works |
| | | Service Profile | What service does |
| | | Service Grounding | How to use service |
| Service B | Type Y | Service Model | How service works |
| | | Service Profile | What service does |
| | | Service Grounding | How to use service |
| Service C | Type Z | Service Model | How service works |
| | | Service Profile | What service does |
| | | Service Grounding | How to use service |
| ... | ... | ... | ... |

Example 2: Federation Ontology Model

As discussed above, the MFB can reference the ontology models stored in the ontology federation model library using semantic queries. The queries may be manual queries that are performed by a user using a user interface, or the queries may be automatically performed by a system using functionality provided by the MFB. Such a lookup may return an exact match, a degraded match where a match is found for only part of the query request, or a composite match where the MFB identifies a combination of several federation cloud brokers and/or cloud services that together match the query request.

In addition to discovery functionality, the MFB may also provide other functionality that add value and enable and encourage federation cloud brokers and other federation participants to use the MFB instead of dealing directly with each other. Thus, as mentioned above, the MFB may provide a monetization platform for the federation cloud brokers and federation participants to transact with each other, as well as for the MFB to monetize the entire ecosystem at all levels (e.g., participant-to-participant, participant-to-FCB, FCB-to-MFB, and participant-to-MFB). In addition, the MFB may provide federation participants with monetization management functionality integrated with the FCB registry, specialized information about cloud services and service providers, auditors, and the like, as well as the federation cloud brokers, so that participants can find and utilize the services effectively. The transaction management functionality may also support creation of provider ratings, or reputations, as this information provides value to participants.

As one example, a federation participant can use normalized, ontological information about available cloud services to find and select a cloud service. In this example, the MFB can present this information based on a set of relevant service dimensions, all of which can be used as filters. For instance, one dimension of a service search is relevance. Relevance may be used to determine that there is a definitive match between the service profiles the customer needs and the service profiles brokered by the FCB. Secondarily, the customer will generally have service level requirements (a high service level implying higher cost). The customer may request that a search for services include in the resultant list only services brokered by an FCB with a sufficiently high provider rating and/or supporting various service characteristics (cost models, Quality-of-Service guarantees, etc.). Cost can also be used as ranking and other filtering criteria among cloud service provider candidates.

Consider an example of a service customer needing a compute platform service for an overnight batch processing job, which is a common requirement for cloud-based big data integration and analytics operations. In this example, the customer would search for a federated compute platform service. As the batch processing job can be executed anytime during the night, the customer may choose to filter by federation type, then select the federation and FCB supporting service quality characteristics that allows the customer to consume the service at the desired cost/quality level, as the customer is willing to accept a relatively low service level to reduce cost. From the customer's perspective, if the processing job can be guaranteed to complete in the next 8 hours at a lower service level, this is adequate.

On the other hand, while low quality of service may be acceptable, the customer may not accept low ratings for the FCB or the cloud federation in which the FCB participates. The customer may demand the cloud federation or the FCB have a minimum rating of 4 out of 5 stars, for example. Once the customer chooses a cloud federation and FCB, they may apply the same selection criteria to their choice of federation service provider (e.g., compute service provider). By providing this detailed level of information and the capability to efficiently find an appropriate federation and service, a customer is likely to continue use of the MFB.

The monetization management functionality of the MFB also benefits cloud federation participants, which helps ensure that the cloud service consumer, provider, and FCB do not execute transactions outside of the MFB. Additionally, providing value that is not found elsewhere can also encourage federation participants to stay within the MFB. For example, the MFB may represent marketplaces and clearinghouses of non-standard computing products and service offerings. This benefits service providers as they can add an additional sales channel for services that may only be temporarily available or may not be saleable via standard channels. This also benefits consumers as they can find services which may pose excellent value. Federation cloud brokers may also benefit in a manner similar to service providers, but as applied to cloud brokerage services.

To continue the compute platform service example, consider a cloud service provider that has extra compute resources available to sell, but which cannot be sold efficiently via normal subscription lifecycle sales process. The MFB may enable such a provider to easily introduce and broker through the federation cloud brokers the service at a lower cost and/or a lower service level agreement (SLA) compute platform services when available, then disable the service when no longer available. By providing a way for cloud service customers to use limited-time or special case service offerings, a provider can make maximum use of available platform resources, thereby generating revenue from resources that may have remained unused without the MFB.

Thus, by offering an easy way for federation cloud brokers to sell a variety of brokerage services, providers to sell a wider variety of cloud services, and the resulting additional choices to customers, the MFB provides value that the federation cloud brokers, providers, and customers will not find outside of the MFB. Value may also be found in the elimination of transactional friction, thereby further reducing the likelihood that federation cloud brokers, providers, and customers may directly execute transactions outside of the MFB.

And as touched upon earlier, the MFB can generate revenue using different monetization models, each providing purpose to specific scenarios. One possibility is to sell MFB services as a subscription to customer and/or providers. Another possibility is to charge a percentage of each transaction conducted through the MFB, either as a flat fee for securing the transaction or a percentage fee on the total cost of the use of the MFB. These fees may be borne by the consumer or the provider, or both. Both scenarios assume that the transaction is monitored by the MFB. Analytics can be used to generate revenue via profiling, data can be provided to service providers to guide them as to which types of service definitions are most in demand. Data can be provided to customers about types of available services which match their usage patterns, and the like.

Following now in FIGS. 5-8 are exemplary workflows or work sequences that may be used to conduct the various transactions discussed above according to one or more embodiments of the MFB.

Figure 5:
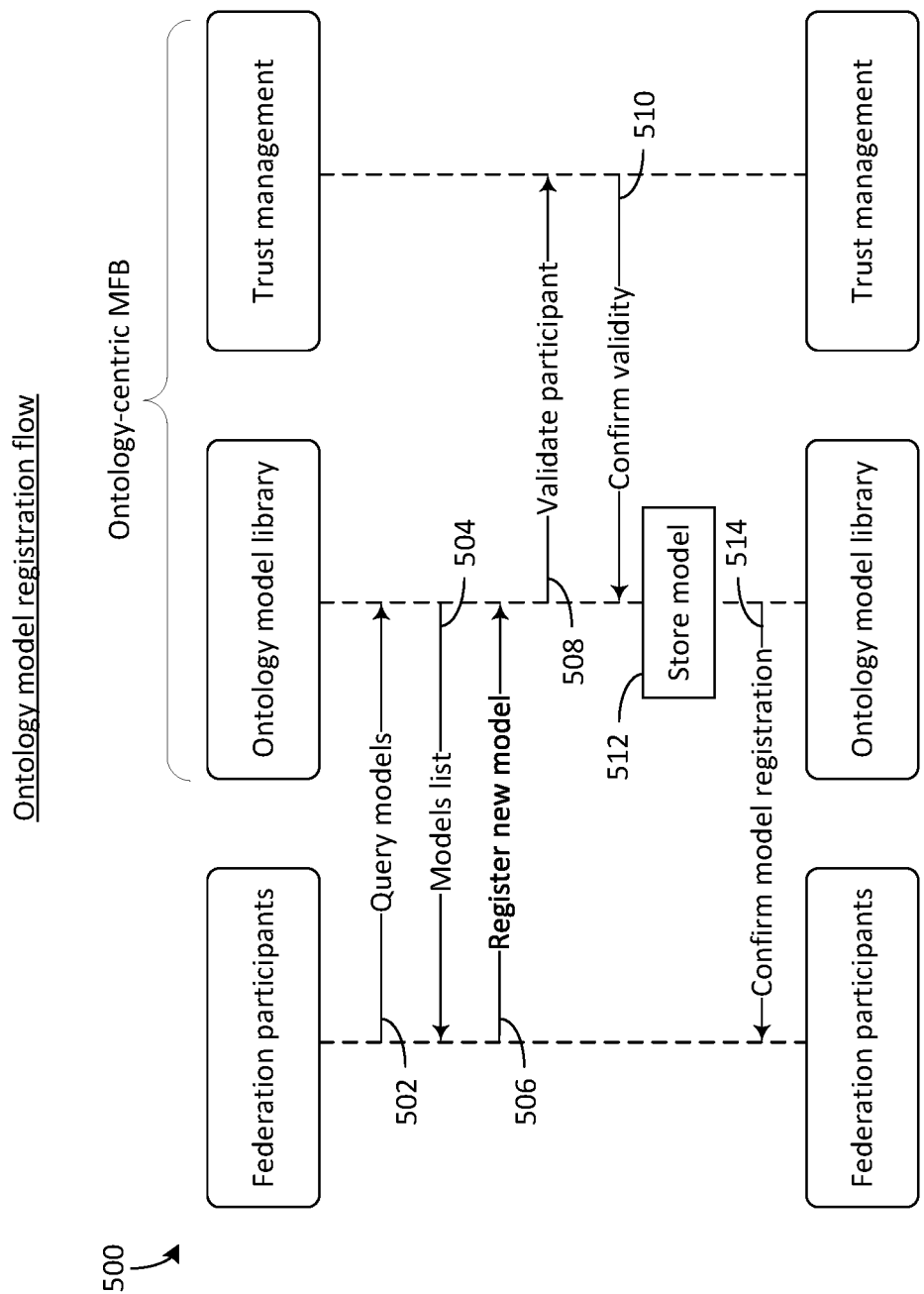
FIG. 5 illustrates an exemplary ontology model registration workflow for an MFB in accordance with various embodiments of this disclosure.

Referring to FIG. 5, an exemplary workflow 500 for registering an ontology model with an MFB according to one or more embodiments is shown. The workflow 500 generally begins at arrow 502 with a federation participant submitting a semantic query to an ontology model library of an MFB to discover ontology models matching certain criteria of interest. For this ontology model registration workflow 500, the federation participant is typically a federation cloud broker, but may also be any federation participants that is seeking to register an ontology model with the MFB. At arrow 504, the MFB processes the query against the ontology model library and returns a list of models, if any, that match or partially match the criteria of interest to the federation participant. Examples may include various identification service models, storage service models, compute service models, and the like.

If the returned list of models does not include any ontology models that match the criteria of interest, the federation participant may submit a new (i.e., not previously registered) ontology model to the ontology model library at arrow 506. Examples of new ontology models may include message services models, e-mail service models, Internet of Things (IoT) service models, and the like. Upon receiving the new ontology model registration request, the MFB validates the federation participant via a trust management module at arrow 508. The trust management module checks whether the federation participant is a legitimate federation participant and, if yes, the trust management module confirms validation of the federation participant at arrow 510. Thereafter, the MFB stores the new ontology model in the ontology model library, indicated at 512, and confirms registration of the new ontology model to the federation participant at arrow 514.

Figure 6:
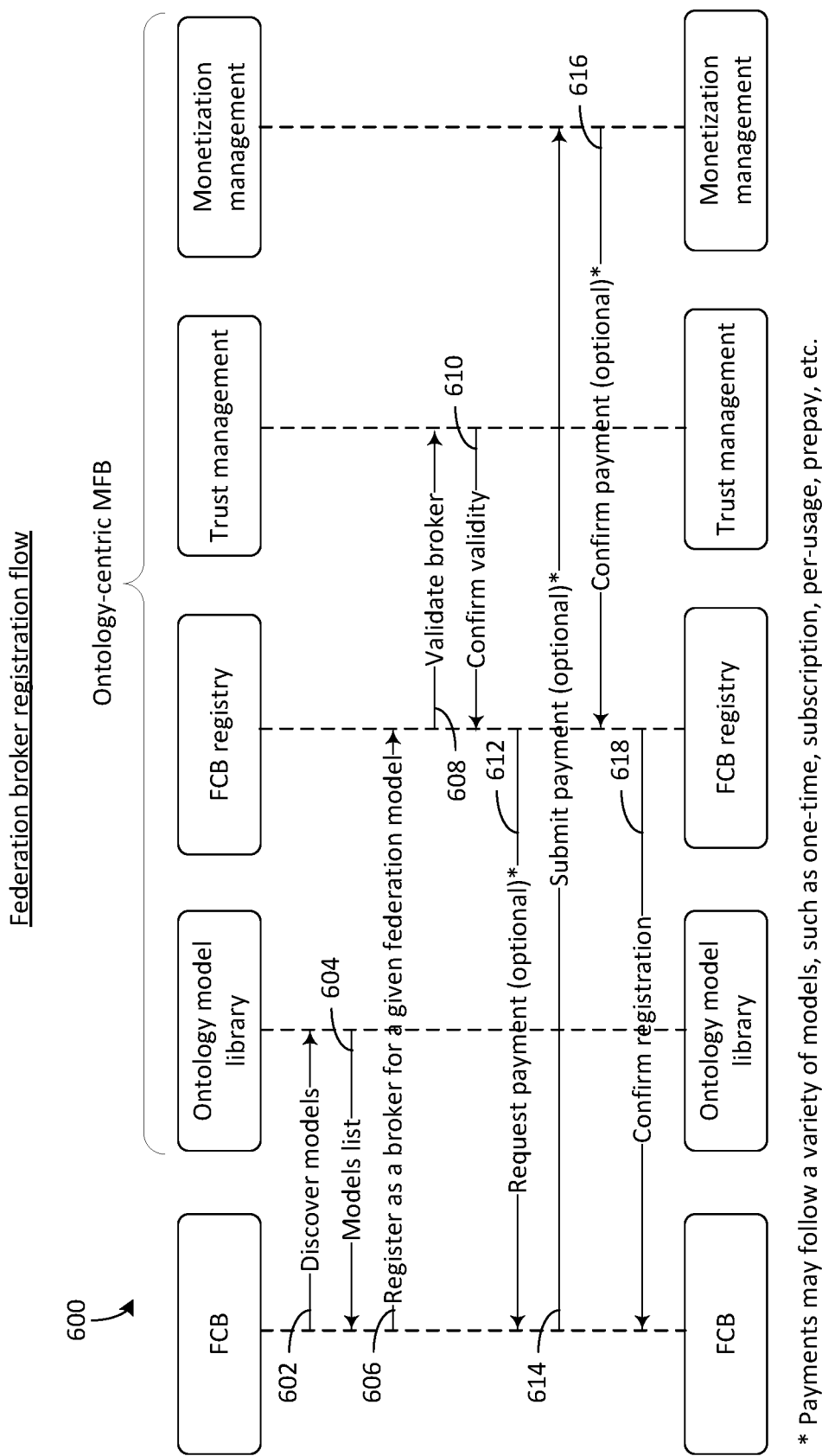
FIG. 6 illustrates an exemplary FCB registration workflow for an MFB in accordance with various embodiments of this disclosure.

FIG. 6 illustrates an exemplary FCB registration workflow 600 for an MFB in accordance with various embodiments of this disclosure. The workflow 600 generally begins at arrow 602 with an FCB submitting a semantic query to an ontology model library of an MFB to discover ontology models matching certain criteria of interest. At arrow 604, MFB processes the query against the ontology model library and returns a list of models, if any, that match or partially match the criteria of interest to the FCB.

Upon receiving the list of ontology models that match the criteria of interest, the FCB may register itself with an FCB registry of the MFB at arrow 606 as a broker for a given federation model or federation type described in one of the ontology models. Upon receiving this FCB registration request, the MFB validates the FCB using a trust management module at arrow 608. The trust management module checks whether the FCB is a legitimate FCB and, if yes, the trust management module confirms the validity of the FCB at arrow 610.

At this point, the MFB may optionally request payment from the FCB at arrow 612 in exchange for allowing the FCB to register itself on the FCB registry. If the payment terms are acceptable, the FCB submits payment at arrow 614 to the MFB via a monetization management module of the MFB. The monetization management module processes and confirms receipt of the payment to the MFB at arrow 616, after which the MFB registers the FCB in the FCB registry. The MFB thereafter confirms the registration of the FCB at arrow 618.

Figure 7:
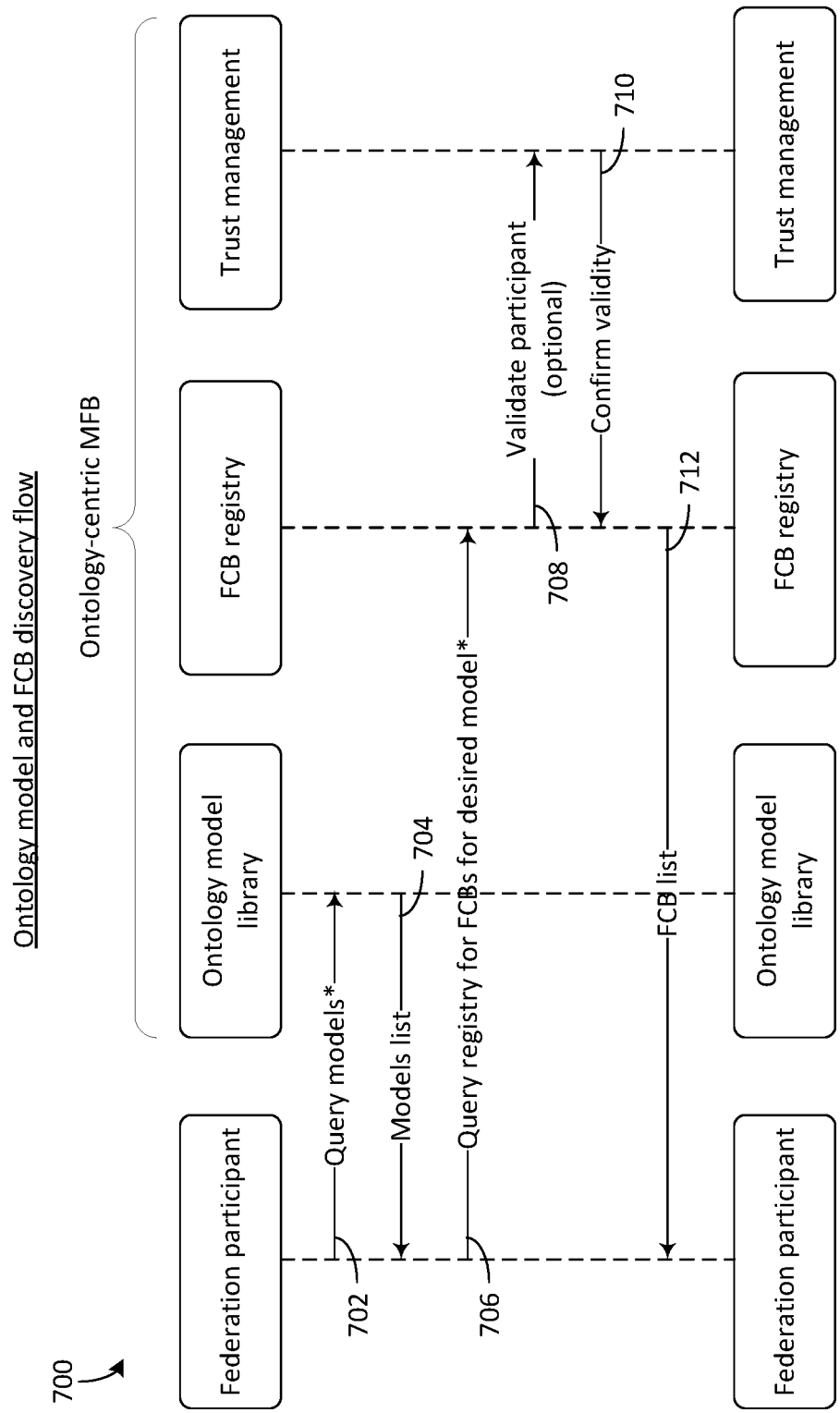
FIG. 7 illustrates an exemplary ontology model and FCB discovery workflow for an MFB in accordance with various embodiments of this disclosure.

FIG. 7 illustrates an exemplary ontology model and FCB discovery workflow 700 for an MFB in accordance with various embodiments of this disclosure. The workflow 700 generally begins at arrow 702 with a federation participant submitting a semantic query to an ontology model library of an MFB to discover ontology models matching certain criteria of interest. The federation participant is likely to be a federation cloud broker for this discovery workflow 700, but may also be any federation participant that is seeking to discover an ontology model and an FCB from the MFB. The MFB processes the query against the ontology model library and returns a list of models, if any, that match or partially match the criteria of interest to the federation participant at arrow 704.

The federation participant then submits a semantic query to an FCB registry of the MFB at arrow 706 to discover federation cloud brokers that broker cloud services corresponding the services described by one or more of the ontology models in the returned list of ontology models. Upon receiving the query for the FCB registry, the MFB validates the federation participant via a trust management module at arrow 708. The trust management module checks whether the federation participant is a legitimate federation participant and, if yes, the trust management module confirms the validity of the federation participant at arrow 710. Thereafter, the MFB processes the query against the FCB registry and returns a list of federation cloud brokers, if any, corresponding to the returned list of ontology models to the federation participant at arrow 712.

Figure 8:
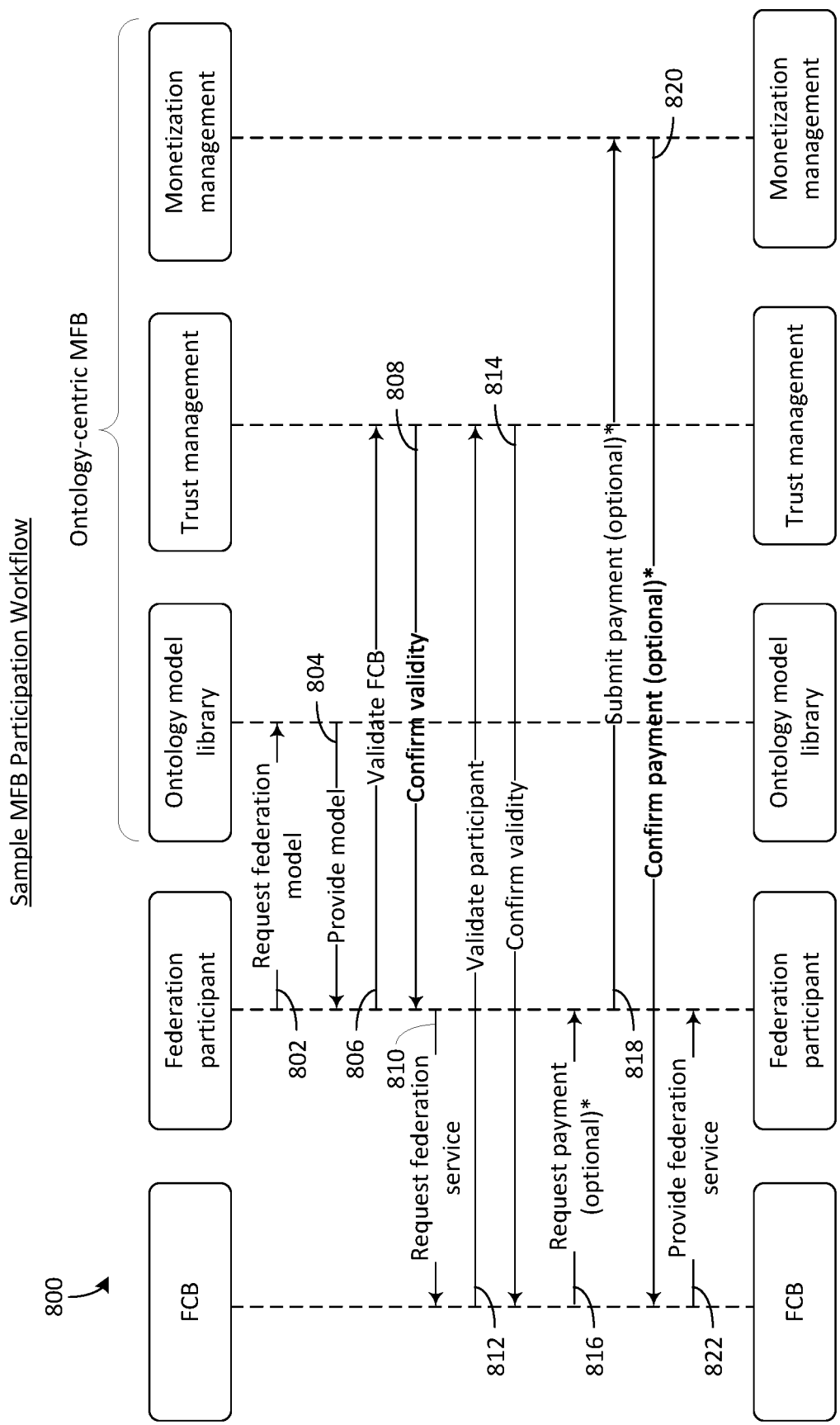
FIG. 8 illustrates an exemplary MFB participation workflow in accordance with various embodiments of this disclosure.

FIG. 8 illustrates an exemplary MFB participation workflow 800 in accordance with various embodiments of this disclosure. The workflow 800 generally begins at arrow 802 with a federation participant submitting a semantic query to an ontology model library of an MFB to determine whether a particular federation model or federation type is currently described by the ontology models in the ontology model library. The MFB processes the query against the ontology model library and returns a list of ontology models, if any, that match or partially match the requested federation model to the federation participant at arrow 804.

The federation participant next selects an FCB that brokers cloud services corresponding to a desired one of the ontology models from the returned list and requests validation of the selected FCB from the MFB at arrow 806. Upon receiving the validation request, the MFB checks via a trust management module whether the selected FCB is a legitimate FCB and, if yes, the MFB confirms the validity of the selected FCB to the federation participant at arrow 808. The federation participant may then request provisioning of federation service from the selected FCB at arrow 810.

Upon receiving the request for provisioning of federation service, the FCB requests validation of the federation participant from the MFB at arrow 812. The MFB then checks via a trust management module whether the federation participant is a legitimate participant and, if yes, the MFB confirms the validity of the federation participant to the FCB at arrow 814.

At arrow 818, the FCB may optionally request payment from the federation participant in exchange for provisioning of the federation service. If the payment terms are acceptable, the federation participant submits payment to the FCB via a monetization management module of the MFB at arrow 818. The monetization management module 810 processes and verifies receipt of the payment, and the MFB confirms the payment to the FCB at arrow 820. The FCB thereafter provisions or arranges for provisioning of the requested federation service to the federation participant at arrow 822.

Figure 9:
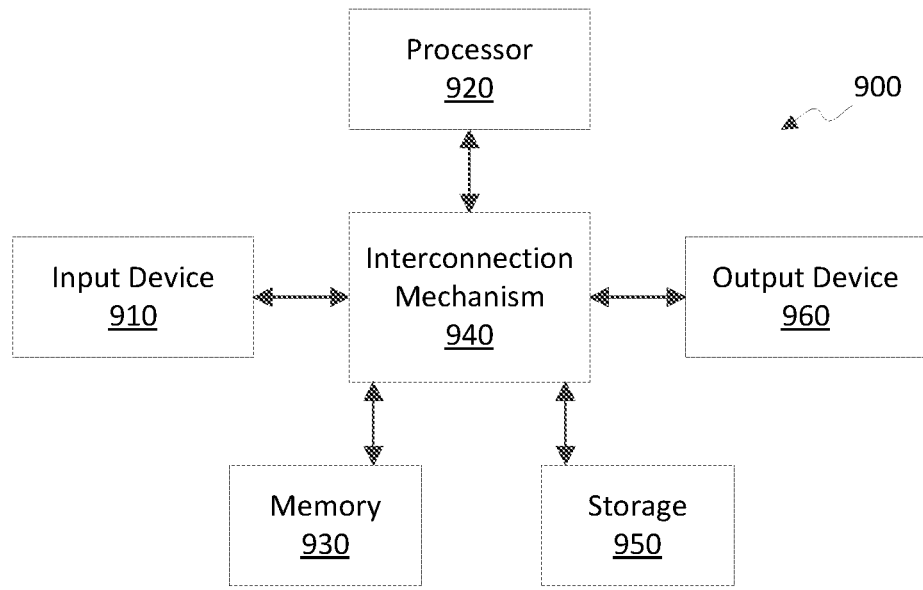
FIG. 9 is a functional block diagram of a general-purpose computer system that may be used to implement various embodiments of this disclosure.

FIG. 9 illustrates an exemplary computing system that may be used to implement various embodiments of this disclosure. In general, any general-purpose computer systems used in various embodiments of this disclosure may be, for example, general-purpose computers such as those based on Intel® Pentium-type processor, Motorola® PowerPC, Sun® UltraSPARC®, Hewlett-Packard® PA-RISC processors, or any other type of processor. Such computer systems may be either physical or virtual.

For example, various embodiments of the disclosure may be implemented as specialized software executing in a general-purpose computer system 900 such as that shown in FIG. 9. The computer system 900 may include a processor 920 connected to one or more memory devices 930, such as a disk drive, memory, or other device for storing data. Memory 930 is typically used for storing programs and data during operation of the computer system 900. The computer system 900 may also include a storage system 950 that provides additional storage capacity. Components of computer system 900 may be coupled by an interconnection mechanism 940, which may include one or more busses (e.g., between components that are integrated within the same machine) and/or a network (e.g., between components that reside on separate discrete machines). The interconnection mechanism 940 enables communications (e.g., data, instructions) to be exchanged between system components of system 900.

Computer system 900 also includes one or more input devices 910, for example, a keyboard, mouse, trackball, microphone, touch screen, and one or more output devices 960, for example, a printing device, display screen, speaker. In addition, computer system 900 may contain one or more interfaces (not shown) that connect computer system 900 to a communication network (in addition or as an alternative to the interconnection mechanism 940).

Figure 10:
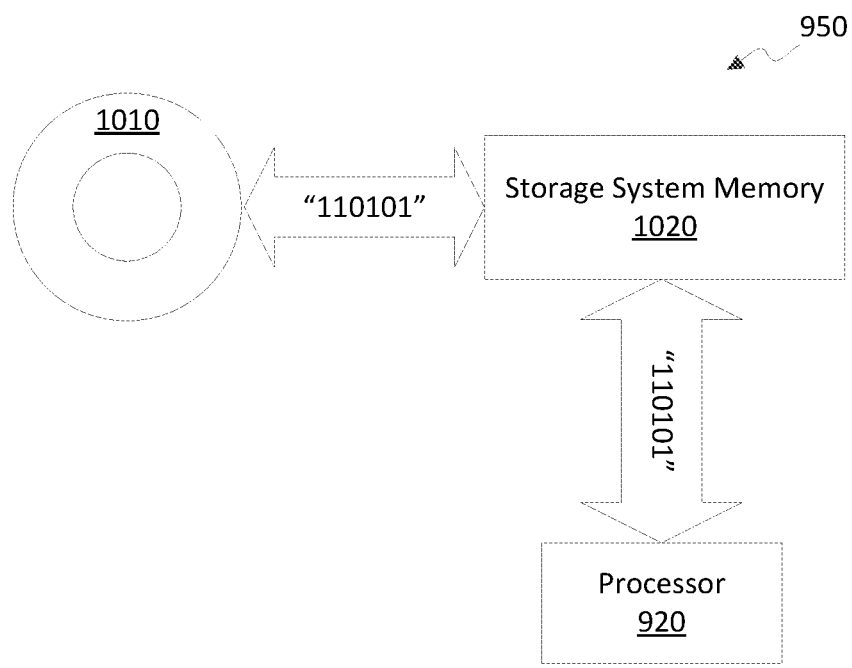
FIG. 10 is a functional block diagram of a general-purpose storage system that may be used to implement various embodiments of this disclosure.

The storage system 950, shown in greater detail in FIG. 10, typically includes a computer readable and writeable nonvolatile recording medium 1010 in which signals are stored that define a program to be executed by the processor 920 or information stored on or in the medium 1010 to be processed by the program to perform one or more functions associated with embodiments described herein. The medium may, for example, be a disk or flash memory. Typically, in operation, the processor 920 causes data to be read from the nonvolatile recording medium 1010 into storage system memory 1020 that allows for faster access to the information by the processor than does the medium 1010. This storage system memory 1020 is typically a volatile, random access memory such as a dynamic random-access memory (DRAM) or static memory (SRAM). This storage system memory 1020 may be located in storage system 950, as shown, or in the system memory 930. The processor 920 generally manipulates the data within the memory system 930 1020 and then copies the data to the medium 1010 after processing is completed. A variety of mechanisms are known for managing data movement between the medium

1010 and the integrated circuit memory element 930, 1020, and the disclosure is not limited thereto. The disclosure is not limited to a particular memory system 930 or storage system 950.

The computer system may include specially-programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computer system described above or as an independent component.

Although computer system 900 is shown by way of example as one type of computer system upon which various aspects of the disclosure may be practiced, it should be appreciated that aspects of the disclosure are not limited to being implemented on the computer system as shown in FIG. 10. Various aspects of the disclosure may be practiced on one or more computers having a different architecture or components shown in FIG. 10. Further, where functions or processes of embodiments of the disclosure are described herein (or in the claims) as being performed on a processor or controller, such description is intended to include systems that use more than one processor or controller to perform the functions.

Computer system 900 may be a general-purpose computer system that is programmable using a high-level computer programming language. Computer system 900 may be also implemented using specially programmed, special purpose hardware. In computer system 900, processor 920 is typically a commercially available processor such as the well-known Pentium class processor available from the Intel Corporation. Many other processors are available. Such a processor usually executes an operating system which may be, for example, the Windows 95, Windows 98, Windows NT, Windows 2000, Windows ME, Windows XP, Vista, Windows 7, Windows 10, or progeny operating systems available from the Microsoft Corporation, MAC OS System X, or progeny operating system available from Apple Computer, the Solaris operating system available from Sun Microsystems, UNIX, Linux (any distribution), or progeny operating systems available from various sources. Many other operating systems may be used.

The processor and operating system together define a computer platform for which application programs in high-level programming languages are written. It should be understood that embodiments of the disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C# (C-Sharp). Other object-oriented programming languages may also be used. Alternatively, functional, scripting, and/or logical programming languages may be used, such as BASIC, Fortran, Cobol, TCL, or Lua. Various aspects of the disclosure may be implemented in a non-programmed environment (e.g., analytics platforms, or documents created in HTML, XML or other format that, when viewed in a window of a browser program render aspects of a graphical-user interface (GUI) or perform other functions). Various aspects of the disclosure may be implemented as programmed or non-programmed elements, or any combination thereof.

Embodiments described above are generally described for use in relatively large data centers having numerous equipment racks; however, embodiments of the disclosure may also be used with smaller data centers and with facilities other than data centers. Some embodiments may also be a very small number of computers distributed geographically so as to not resemble a particular architecture.

In embodiments of the present disclosure, results of analyses are described as being provided in real-time. As understood by those skilled in the art, the use of the term real-time is not meant to suggest that the results are available immediately, but rather, are available quickly giving a designer the ability to try a number of different designs over a short period of time, such as a matter of minutes.

Having thus described several embodiments, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the scope of the disclosed embodiments as defined in the appended claims.

What is claimed is:

1. A method of implementing a federated computing environment, comprising:

receiving, at a meta federation broker, from a federation participant, a federation participant query that includes semantic query data;

identifying at least one ontology model from a plurality of ontology models stored in an ontology model library based on processing the semantic query data included in the federation participant query, each ontology model containing ontological data that describes federation services based on relationships between components of the federated computing environment;

validating, by the meta federation broker, a federation broker that brokers at least one federation service described by the ontological data in the at least one ontology model; and facilitating, by the meta federation broker, brokerage service related to the at least one federation service from the federation broker to the federation participant.

2. The method according to claim 1, further comprising validating the federation participant by the meta federation broker before facilitating brokerage service related to the at least one federation service from the federation broker to the federation participant.

3. The method according to claim 1, further comprising facilitating by the meta federation broker payment from the federation participant to at least one federation broker before facilitating brokerage service related to the at least one federation service from the federation broker to the federation participant.

4. The method according to claim 1, wherein the federation participant is a first federation participant and the at least one federation service is provided by a second federation participant, further comprising facilitating by the meta federation broker payment from the federation participant to the second federation participant.

5. The method according to claim 4, further comprising receiving by the meta federation broker one or more new ontology models from one or more of the federation broker, the first federation participant, the second federation participant, or a non-federation-participant, and storing the one or more new ontology models by the meta federation broker.

6. The method according to claim 1, further comprising receiving by the meta federation broker registration information for one or more new federation brokers and storing the registration information by the meta federation broker.

7. The method according to claim 1, further comprising ranking the at least one ontology model based on one or more ranking criteria provided by a cloud service consumer, including reviews, quality of service, and service pricing.

8. The method according to claim 1, wherein the ontology models are used for brokering services by the meta federation broker.

9. The method according to claim 1, wherein the validation by the meta federated broker includes one of the cloud federation participants or management of financial transactions.

10. A system for implementing a federated computing environment, comprising:
one or more computer processors; and
a memory containing computer program code that, when executed by operation of the one or more computer processors, performs an operation comprising:
registering a new ontology model with a meta federation broker in an ontology model library of the meta federation broker;
registering, with the meta federation broker, as a federation broker for the new ontology model, wherein the new ontology model defines an ontology that characterizes federation services according to relationships between components of the federated computing environment;
upon receiving a request for a federation service from a federation participant, validating the federation participant with the meta federation broker; and
upon successful validation of the federation participant, brokering the requested federation service for the federation participant.

11. The system according to claim 10, wherein the operation further composes submitting a query to the ontological model library of the meta federation broker, the query including semantic query data describing a given ontology model of interest.

12. The system according to claim 10, wherein the operation further composes requesting, through the meta federation broker, payment from the federation participant for the requested federation service before brokering the requested federation service.

13. The system according to claim 10, wherein the federation participant is a first federation participant and the requested federation service is provided by a second federation participant.

14. The system according to claim 10, wherein the requested federation service is one of: Software as a Service (SaaS), Data Storage as a Service (DaaS), Infrastructure as a Service (IaaS), Platform as a Service (PaaS).

15. The system according to claim 10, wherein the federation broker is one of: an identity federation broker, a storage federation broker, a compute federation broker, a messaging federation broker, and an Internet of Things (IoT) federation broker.

16. The system according to claim 10, wherein the federated computing environment is a federated cloud computing environment.

17. A method of implementing a federated computing environment, comprising:
requesting, from a meta federation broker, a federation ontology model defining
an ontology that describes federation services using relationships between components of the federated cloud computing environment;
identifying a federation broker that brokers a federation service described in the federation ontology model;
validating the federation broker with the meta federation broker;
upon successfully validating the federation broker with the meta federation broker, transmitting a request for the federation service to the federation broker; and
receiving, from the federation broker, brokerage service related to the federation service.

18. The method according to claim 17, wherein requesting a federation ontology model from the meta federation broker comprises submitting a query that includes semantic query data describing the federation ontology model.

19. The method according to claim 17, further comprising submitting, through the meta federation broker, payment to the federation broker before receiving the brokerage service related to the federation service from the federation broker.

20. The method according to claim 17, wherein the federation service is provided by a federation participant of the federated computing environment through the federation broker.

21. The method according to claim 17, further comprising providing review of the federation service through the meta federation broker provided by a cloud service consumer.

22. The method according to claim 17, further comprising requesting, from the meta federation broker, a list of federation brokers that provide a given federation service.

23. A meta federation broker for a federated computing environment, comprising:
an ontology model library storing a plurality of ontology models, each ontology model containing ontological data that describes federation services based on relationships between components of the federated computing environment;

a federation broker registry storing registration information for a plurality of federation brokers, each federation broker providing brokerage services related to at least one federation service described by the plurality of ontology models;

a discovery processor operable to receive from a federation participant a federation participant query that includes semantic query data, the discovery processor further operable to identify at least one ontology model from the plurality of ontology models based on processing the semantic query data included in the federation participant query; and a registry processor operable to receive, from a federation broker, a registration request to register the federation broker as providing validated brokerage services related to a federation service described by one of the plurality of ontology models, the registry processor further operable to store registration information for the federation broker on the federation broker registry.

24. The meta federation broker according to claim 23, further comprising a trust management module operable to validate the federation broker before registration information for the federation broker is stored on the federation broker registry.

25. The meta federation broker according to claim 24, wherein the trust management module is further operable to validate the federation participant before the semantic query data included in the federation participant query is processed.

26. The meta federation broker according to claim 23, further comprising a monetization management module operable to receive payment from the federation broker before registration information for the federation broker is stored on the federation broker registry.

27. The meta federation broker according to claim 26, wherein the monetization management module is further operable to receive payment from the federation participant before the federation participant receives brokerage services related to a federation service described by one of the plurality of ontology models.

28. The meta federation broker according to claim 23, wherein the discovery processor is further operable to receive one or more new ontology models from the federation participant or federation broker and to store the one or more new-ontology models in the ontology model library.

29. The meta federation broker according to claim 23, wherein the discovery processor is further operable to rank the at least one ontology model based on one or more ranking criteria, including reviews, quality of service, and service pricing.

30. The meta federation broker according to claim 23, wherein the federation participant is a first federation participant and the federation service described by one of the plurality of ontology models is provided by a second federation participant.

* * * * *